(12) United States Patent
Agulnik et al.

(10) Patent No.: US 9,615,261 B2
(45) Date of Patent: Apr. 4, 2017

(54) METHOD AND APPARATUS FOR INCIDENT TASK BASED ALLOCATION OF SERVICE INSTANCES

(71) Applicant: MOTOROLA SOLUTIONS, INC, Schaumburg, IL (US)

(72) Inventors: Anatoly Agulnik, Deerfield, IL (US); Trent J. Miller, West Chicago, IL (US); Michael D. Pearce, Barrington, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 259 days.

(21) Appl. No.: 14/262,285

(22) Filed: Apr. 25, 2014

(65) Prior Publication Data

US 2015/0312772 A1    Oct. 29, 2015

(51) Int. Cl.
| | | |
|---|---|---|
| H04W 16/18 | (2009.01) | |
| H04W 8/18 | (2009.01) | |
| H04W 4/08 | (2009.01) | |
| H04W 4/22 | (2009.01) | |
| H04W 76/00 | (2009.01) | |
| H04W 76/04 | (2009.01) | |
| H04W 88/04 | (2009.01) | |
| G06Q 10/06 | (2012.01) | |
| H04W 4/00 | (2009.01) | |
| H04W 4/10 | (2009.01) | |

(52) U.S. Cl.
CPC ............. *H04W 16/18* (2013.01); *H04W 4/08* (2013.01); *H04W 4/22* (2013.01); *H04W 8/18* (2013.01); *H04W 76/007* (2013.01); *H04W 76/04* (2013.01); *H04W 88/04* (2013.01); G06Q 10/0633 (2013.01); H04W 4/001 (2013.01); H04W 4/10 (2013.01)

(58) Field of Classification Search
CPC ........... H04W 4/08; H04W 4/22; H04W 4/06; H04W 4/12; H04W 68/02
See application file for complete search history.

(56) References Cited

U.S. PATENT DOCUMENTS

| | | |
|---|---|---|
| 849,881 A | 4/1907 | Bartlett |
| 6,446,004 B1 | 9/2002 | Cao |
| 7,711,382 B2 | 5/2010 | Oxley |
| 7,720,458 B2 | 5/2010 | Impson |

(Continued)

FOREIGN PATENT DOCUMENTS

WO    2014178960 A1    11/2014

OTHER PUBLICATIONS

PCT International Search Report Dated June 23, 2015 for Counterpart Application PCT/US2015/026142.

*Primary Examiner* — Chandrahas Patel

(57) ABSTRACT

A method and apparatus for task-based allocation of services at an incident scene include determining assignments for a plurality of users at the incident scene, each of the plurality of users comprising a mobile device; identifying a group of the plurality of users performing a similar function near one another or at a same area; determining if the group is likely to be separated from a wireless local area network at the incident scene; and, in response to determining that the group is likely to be separated from the local area network, allocating service instances on at least one mobile device associated with the group.

15 Claims, 5 Drawing Sheets

(56) References Cited

U.S. PATENT DOCUMENTS

| | | | |
|---|---|---|---|
| 8,576,846 B2 * | 11/2013 | Kumar | H04L 63/0428 370/392 |
| 2010/0082810 A1 | 4/2010 | Patel et al. | |
| 2011/0045851 A1 | 2/2011 | Maddox | |
| 2011/0182426 A1 | 7/2011 | Roosta | |
| 2012/0170447 A1 | 7/2012 | Bell et al. | |
| 2013/0182614 A1 | 7/2013 | Kumar et al. | |
| 2014/0321444 A1 | 10/2014 | Klein et al. | |

* cited by examiner

METHOD AND APPARATUS FOR INCIDENT TASK BASED ALLOCATION OF SERVICE INSTANCES

BACKGROUND OF THE INVENTION

The present disclosure relates to wireless networking in a geographic area amongst a plurality of users, such as users at a public safety incident scene. Conventionally, public safety systems offer centralized services that reside at a central area and are available to public safety users in the field through a wireless Wide Area Network (WWAN) serving a large geographic area such as a city or county. Public safety systems are evolving such that first responders are equipped with mobile devices, in the form of handsets, laptops, etc. that have the capability of wirelessly networking together in a high-speed wireless Local Area Network (WLAN) serving a much smaller geographic area, such as a city block. Exemplary services can include video services via a server, web services via a server, push-to-talk services, location services, etc. Mobile devices are moving to host client/server-based services in the WLAN for the needs of first responders. The benefits of hosting local services on the WLAN are reduced latency connections from those services hosted in the WLAN vs. the WWAN, reduced data traffic on the WWAN as the traffic now becomes local to the LAN, and the ability to operate without a connection to the WWAN, for some services. Local hosting of services includes one or more service instances being hosted on mobile devices in the WLAN associated with public safety responders.

During an incident, an incident manager or commander may direct a small group of responders at an incident scene such that the small group of responders is isolated from the rest of the group (WLAN). The small group loses RF coverage from the main incident scene, but the small group may still have WLAN RF coverage with each other (which generally lack an application/service instance). In such a scenario, a case can arise when none of the small group of responders has an instance of a particular application/service. If a service instance is not running on one of the mobile devices associated with the small group, the small group loses the capability(ies) provide by the service instance. Accordingly, there is a need for a method and apparatus for incident task based allocation of service instances for responders that may separate from the main incident scene (and lose RF coverage with the main incident scene), thereby allowing the small group to continue to communicate with each other.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
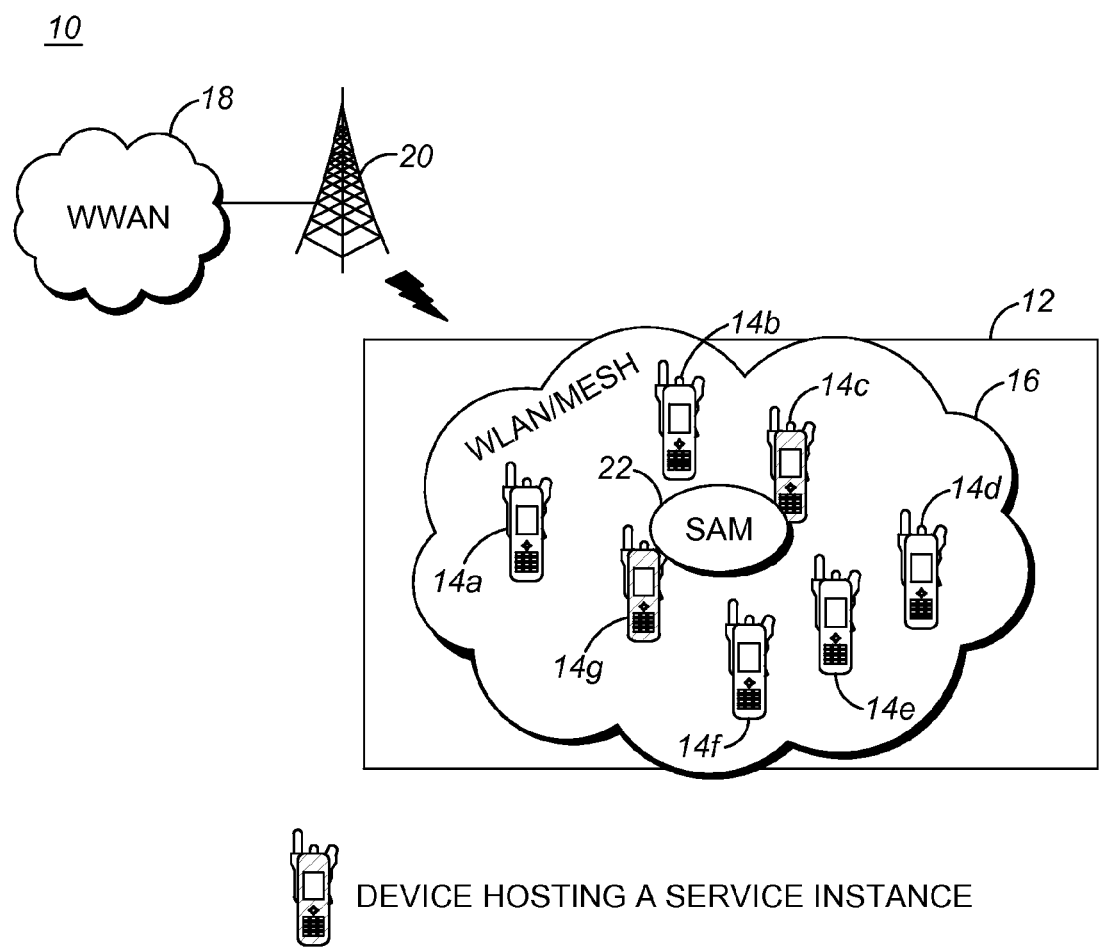
FIG. 1 is a network diagram of a network illustrating an exemplary operational scenario of the method and apparatus for an incident task based allocation of services at an incident scene in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In various exemplary embodiments, a method and apparatus for an incident task based allocation of service instances is described. There are several instances of the same service allocated at the incident scene such as for high availability, because of the very dynamic nature of devices connected by a wireless LAN (WLAN) (devices can leave the coverage and come back later). For the same reasons the information/data in those instances is synchronized to enable any instance to serve any group of users/devices. Variously, an incident task analyzer is proposed in a wireless LAN that uses incident task information to identify a group of responders who are expected to work together. Further, the incident task analyzer also determines if the group of responders will likely lose connectivity with the rest of responders at the incident scene, for example, the group of responders are directed inside a building, to the other side of the building, into the building's basement. Yet further, the incident task analyzer provides the list of devices belonging to the identified group of responders to a service allocation manager and the service allocation manager allocates service instances to ensure that at least one service instance is available to devices belonging to the identified group of responders. Also, re-allocation of the instances may happen at any time. It can be triggered by: more devices arrived at the scene or left/went out of coverage; a device hosted an instance disconnects from the WLAN or dies (battery); changes in the topology of the WLAN and/or intensity of the service usage, etc.

In an exemplary embodiment, a method for task-based allocation of services at an incident scene includes determining assignments for a plurality of users at the incident scene, each of the plurality of users comprising a mobile device; identifying a group of the plurality of users performing a similar function near one another or at a same area; determining if the group is likely to be separated from a wireless local area network at the incident scene; and, in response to determining that the group is likely to be separated from the local area network, allocating service instances on at least one mobile device associated with the group.

In another exemplary embodiment, an apparatus for task-based allocation of services includes a network interface, memory, and a processor each communicatively coupled therebetween; and instructions stored in the memory that, when executed, cause the processor to: determine assignments for a plurality of users at an incident, each of the plurality of users comprising a mobile device; identify a group of the plurality of users performing a similar function near one another or at a same area; determine if the group is likely to be separated from a wireless local area network at the incident; and, in response to determining that the group is likely to be separated from the wireless local area network, cause an allocation of service instances on at least one mobile device associated with the group.

In yet another exemplary embodiment, a wireless local area network with locally hosted service instances at an incident includes a plurality of mobile devices each associated with a responder; a mobile device associated with an incident commander or a dispatcher; a service allocation manager causing one or more of the mobile devices to locally host service instances used at the incident in the wireless local area network; and an incident task analyzer configured to: determine assignments for each responder associated with the plurality of mobile devices; identify a group of the plurality of mobile devices with associated responders performing a similar function near one another or at a same area; determine if the group is likely to be separated from the wireless local area network; and, in response to determining that the group is likely to be separated from the wireless local area network, cause an allocation of the service instances through the service allocation manager on at least one mobile device associated with the group.

FIG. 1 is a network diagram of a network 10 illustrating an exemplary operational scenario at an incident scene 12 in accordance with some embodiments. The incident scene 12 includes a geographic area such as at a public safety incident. The network 10 includes various mobile devices 14 (depicted as mobile devices 14a-14g) at the incident scene 12, creating a WLAN or mesh network therebetween (hereinafter referred to as a WLAN 16). The WLAN 16 can be operated using an suitable wireless LAN protocol such as, for example, IEEE 802.11 and variants thereof ("Wi-Fi"), Bluetooth, HiperLAN, ZigBee (IEEE 802.15.4), WiMAX (IEEE 802.16e), and the like. The network 10 can also include access to a WWAN 18 via one or more base stations 20. The WWAN can include any suitable wireless WAN protocol such as, for example, Long Term Evolution (LTE), cellular/wireless telecommunication protocols (e.g. 3G/4G, etc.), Land Mobile Radio (LMR), Digital Mobile Radio (DMR), Terrestrial Trunked Radio (TETRA); Project 25 (P25), and the like.

In this exemplary operational scenario, the mobile devices 14c, 14g are hosting service instances for the WLAN 16. As described herein, services (or applications) are hosted locally in the WLAN 16 by the mobile devices 14c, 14g hosting service instances. The services (or applications) can include anything utilized by the first responders associated with the mobile devices 14 such as, for example, video services via a service instance, web services via a service instance, push-to-talk services, location services, command-and-control services, etc. Note, the services (or applications) can also be hosted centrally in the WWAN 18. The method and apparatus described herein assumes local hosting of the services in the WLAN 16 and dealing with mobile devices 14 that are cut off from the WLAN 16. The WLAN 16 can also include a service allocation manager (SAM) 22 which is configured to assign or allocate service instances to the mobile devices 14, i.e. perform a service instance allocation function. Specifically, the SAM 22 can provide a service instances allocation function which determines which of the mobile devices 14 host specific service instances in the WLAN 16. The SAM 22 is a logical function that can be operated in a distributed fashion amongst the mobile devices 14 or in a centralized manner such as in the WWAN 18 or on an incident commander's mobile device 14.

In the U.S., a national standard, National Incident Management System (NIMS) Incident Command System (ICS), provides a method for an incident commander (IC) to direct incident resources. For example, the ICS has standardized role definitions for each incident type where the IC assigns users to roles to create an incident command and control hierarchy. The IC can have a command mobile device 14, e.g., a tablet, etc., for the IC to assign resources to tasks (e.g., "ladder company 2, proceed to the back of the building for search and rescue"). The ICS is a standard designed to support all incidents and all disciplines (police, fire, EMS, local, state, federal, etc.). Additionally, the incident scene 12 has to support limited or no WWAN 18 connectivity. In order to support this type of RF environment, the method and apparatus described herein uses application servers and service instances at the incident scene 12 itself, hosted on local mobile devices 14. Selecting devices to host instances of the same service is a complex multi-criteria task, performed by the SAM 22. Also, replicas of services at the incident scene 12 can synchronize with each other to provide high availability (e.g., if a police car drives away with a server in the trunk, service can continue at the incident scene 12).

The SAM 22 functionality accounts for the fact that the incident scene 12 is dynamic in nature with responders arriving over time (and their associated mobile devices 14). During the course of the incident, first responders may be assigned/unassigned to the incident and arrive/leave the scene. Moreover, as first responders move about the incident scene 12, the connection of their mobile devices 14 to the WLAN 16 may change, particularly in an urban environment. Thus, the WLAN 16 is likely to have mobile devices 14 where the connections between the mobile devices 14 themselves come and go during lifetime of the incident. In an exemplary embodiment, the SAM 22 can be implemented as a method with the steps of determining a set of services deployed on a particular mobile device 14; determining a number (T) of mobile devices 14 within the WLAN 16 running and offering the particular service; determining a number (C) of mobile devices 14 within the WLAN 16 that are capable of running and offering the particular service, but currently are not; and determining whether to start, cease, or continue to offer the particular service to mobile devices 14 on the WLAN 16 based on T and C. For example, a determination of the number of mobile devices 14 that can offer the service can be based on available node resources (CPU, memory, etc.), available RF bandwidth to the node, packet loss and latency to the node, a number of users utilizing node, etc.

Figure 2:
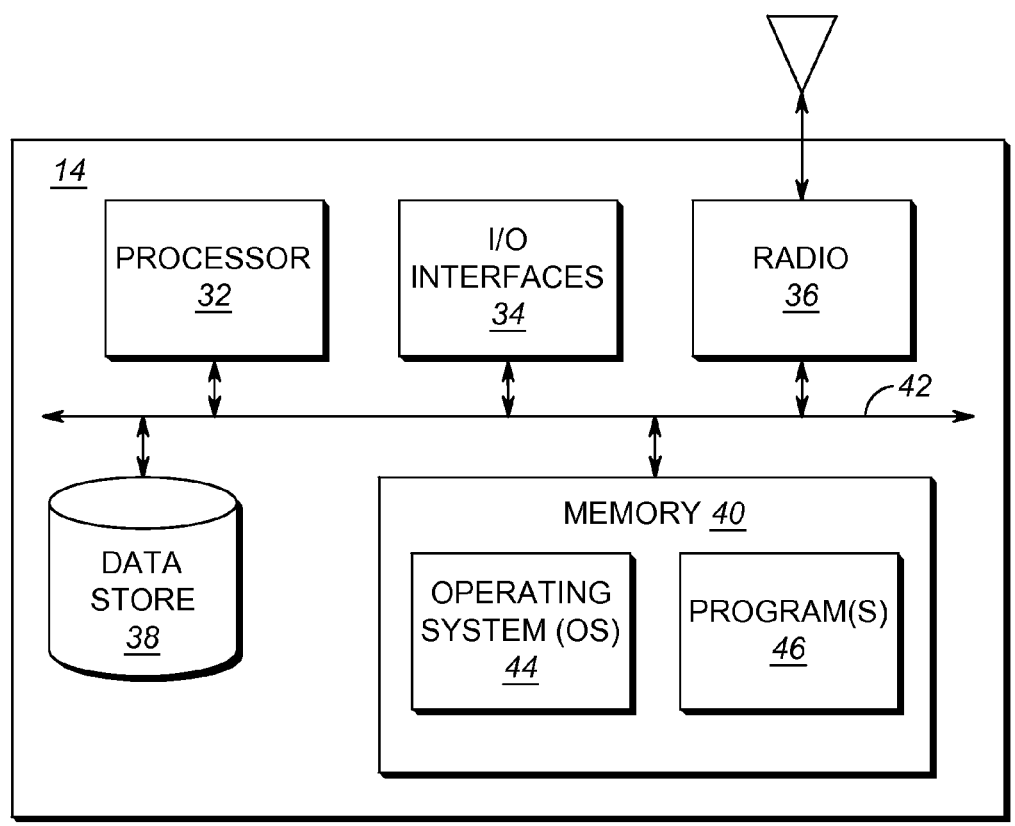
FIG. 2 is a block diagram of an exemplary mobile device for use in the network of FIG. 1 in accordance with some embodiments.

FIG. 2 is a block diagram of an exemplary mobile device 14 for use in the network 10 in accordance with some embodiments. The mobile devices 14 in the network 10 can include, for example, smart phones, handheld radios, vehicle modems, servers mounted in vehicles, tablets, laptops, body-worn computing devices, etc. The mobile device 14 can be a digital device that, in terms of hardware architecture, generally includes a processor 32, input/output (I/O) interfaces 34, a radio 36, a data store 38, and memory 40. It should be appreciated by those of ordinary skill in the art that FIG. 2 depicts the mobile device 14 in an oversimplified manner, and a practical embodiment may include additional components and suitably configured processing logic to support known or conventional operating features that are not described in detail herein. The components (32, 34, 36, 38, and 40) are communicatively coupled via a local interface 42. The local interface 42 can be, for example but not limited to, one or more buses or other wired or wireless connections, as is known in the art. The local interface 42 can have additional elements, which are omitted for simplicity, such as controllers, buffers (caches), drivers, repeaters, and receivers, among many others, to enable communications. Further, the local interface 42 may include address, control, and/or data connections to enable appropriate communications among the aforementioned components.

The processor 32 is a hardware device for executing software instructions. The processor 32 can be any custom made or commercially available processor, a central processing unit (CPU), an auxiliary processor among several processors associated with the mobile device 14, a semiconductor-based microprocessor (in the form of a microchip or chip set), or generally any device for executing software instructions. When the mobile device 14 is in operation, the processor 32 is configured to execute software stored within the memory 40, to communicate data to and from the memory 40, and to generally control operations of the mobile device 14 pursuant to the software instructions. In an exemplary embodiment, the processor 32 may include a mobile optimized processor such as optimized for power consumption and mobile applications. The I/O interfaces 34 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 34 can also include, for example, a serial port, a parallel port, a small computer system interface (SCSI), an infrared (IR) interface, a radio frequency (RF) interface, a universal serial bus (USB) interface, and the like. The I/O interfaces 34 can include a graphical user interface (GUI) that enables a user to interact with the mobile device 14. Additionally, the I/O interfaces 34 may further include an imaging device, i.e. camera, video camera, etc.

The radio 36 enables wireless communication to an external access device or network. Any number of suitable wireless data communication protocols, techniques, or methodologies can be supported by the radio 36, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The radio 36 can also support location tracking such as via Global Positioning Satellite (GPS) and the like.

The data store 38 may be used to store data. The data store 38 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 38 may incorporate electronic, magnetic, optical, and/or other types of storage media. The memory 40 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 40 may incorporate electronic, magnetic, optical, and/or other types of storage media. Note that the memory 40 may have a distributed architecture, where various components are situated remotely from one another, but can be accessed by the processor 32.

The software in memory 40 can include one or more software programs, each of which includes an ordered listing of executable instructions for implementing logical functions. In the example of FIG. 2, the software in the memory 40 includes a suitable operating system (O/S) 44 and programs 46. The operating system 44 essentially controls the execution of other computer programs, and provides scheduling, input-output control, file and data management, memory management, and communication control and related services. The programs 46 may include various applications, add-ons, etc. configured to provide end user functionality with the mobile device 14. In the method and apparatus, the programs 46 can include the various service instances described herein as well as the SAM 22 functionality. In an exemplary embodiment, the programs 46 can enable the various services and service instances. Again, the services can include PTT, video, web, location tracking, command and control, etc.

In an exemplary embodiment, the mobile device 14 can be used as an apparatus for an incident task based allocation of services. For example, the mobile device 14 can be associated with a dispatcher or an incident commander and can include incident task analyzer functionality (as described in FIGS. 4-5 relative to the incident task analyzer 60). Here, the mobile device 14 can include a program 46 comprising instructions stored in the memory 40 that, when executed, causes the processor 32 to perform the steps of: determining assignments for a plurality of users at the incident scene, each of the plurality of users comprising a mobile device; identifying a group of the plurality of users performing a similar function near one another or at a same area; determining if the group is likely to be separated from a wireless local area network at the incident scene; and allocating service instances on at least one mobile device associated with the group.

Figure 3:
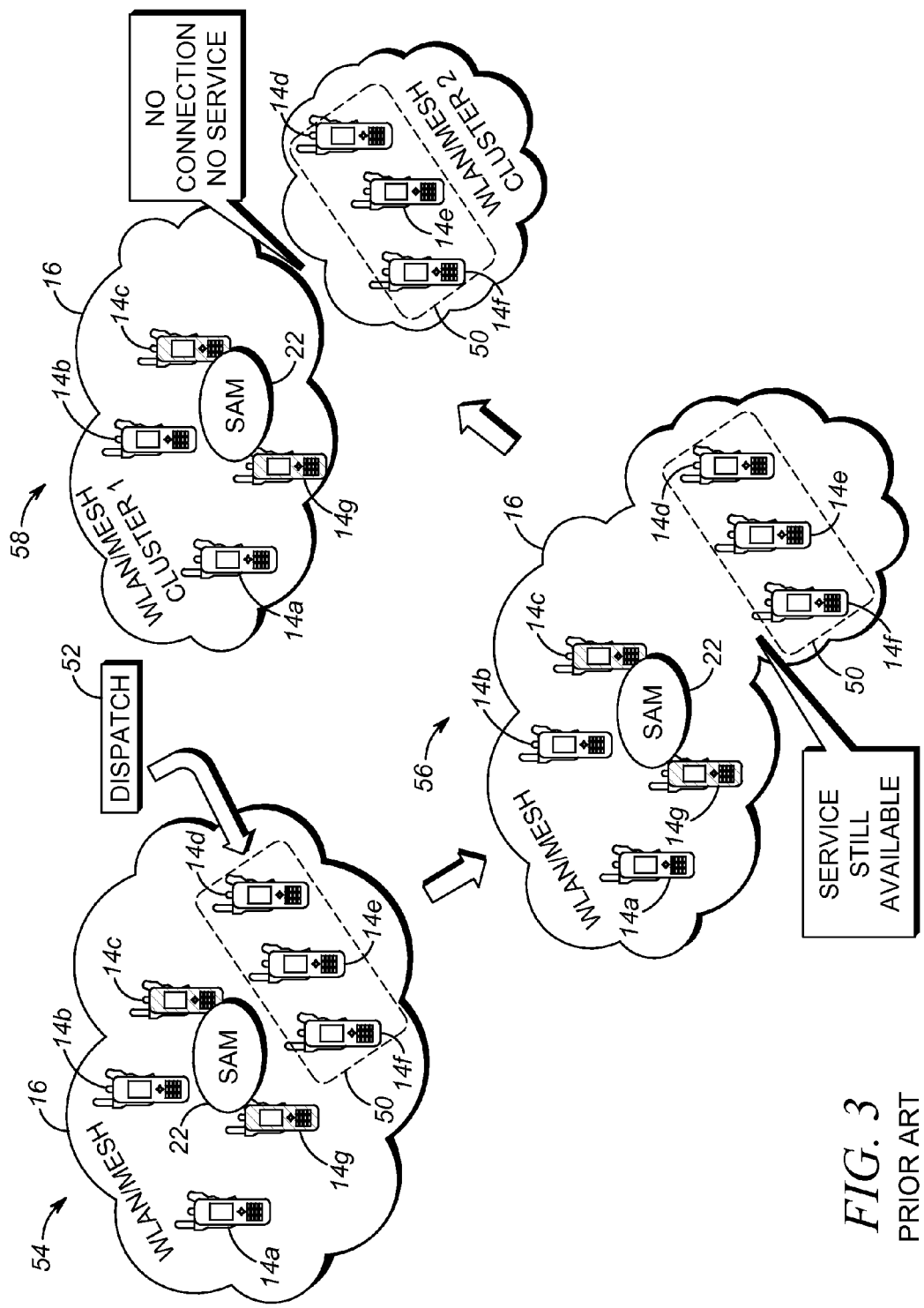
FIG. 3 is a network diagram over time of the network of FIG. 1 illustrating conventional behavior where a group of responders is separated from the WLAN losing connectivity in accordance with some embodiments.

FIG. 3 is a network diagram over time of the network 10 illustrating conventional behavior where a group of responders 50 is separated from the WLAN 16 losing connectivity in accordance with some embodiments. FIG. 3 is an exemplary operation using conventional behavior. Assume there are a significant number of responders at or near an incident scene, each with a mobile device 14. As described herein, the mobile devices 14a-14g have formed the WLAN 16 locally, i.e., a mesh or ad-hoc network. Some of the mobile devices 14a-14g host instances of local PS services, e.g., the mobile devices 14c, 14g, and everything is working at the incident scene 12. A dispatcher 52 or incident commander assigns the group of responders 50 (which group includes fewer than all of the mobile devices 14a-14g, e.g., mobile devices 14d, 14e, 14f) a task (step 54), e.g., enter a building. The group of responders 50 begin the task, e.g., moving towards the building, and connectivity with the remaining team members, i.e., the mobile devices 14a, 14b, 14c, 14g, and the WLAN 16 becomes worse and worse (step 56). Finally, the group of responders 50 enters the building and all communications to outside the building get disconnected (step 58). In this conventional behavior of FIG. 3, none of the mobile devices 14d, 14e, 14f associated with the group of responders 50 have service instances. Thus, the group of responders 50 have no connection to the WLAN 16 and no service (since no local service instances are running)

In various exemplary embodiments, the method and apparatus for an incident task based allocation of services ensures that required service instances are included in the group of responders 50. For example, the service instances could be reinstated at the step 58 once it is determined that the group of responders 50 has no connectivity to the WLAN 16. This could allow the mobile devices 14d, 14e, 14f to regain connectivity with one another for various services. However, recreating the service instances on one of the mobile devices 14d, 14e, 14f after WLAN 16 connectivity is lost means that the new, recreated service instances are not synchronized with the service instances in the WLAN 16, i.e., the service instances operating on the mobile devices 14c, 14g. It is an objective of the method and apparatus described herein to create new service instances on at least one mobile device 14d, 14e, 14f in the group of responders 50 prior to loss of connectivity with the WLAN 16 such that the newly created service instances can synchronize with the existing service instances prior to the loss of connectivity.

Figure 4:
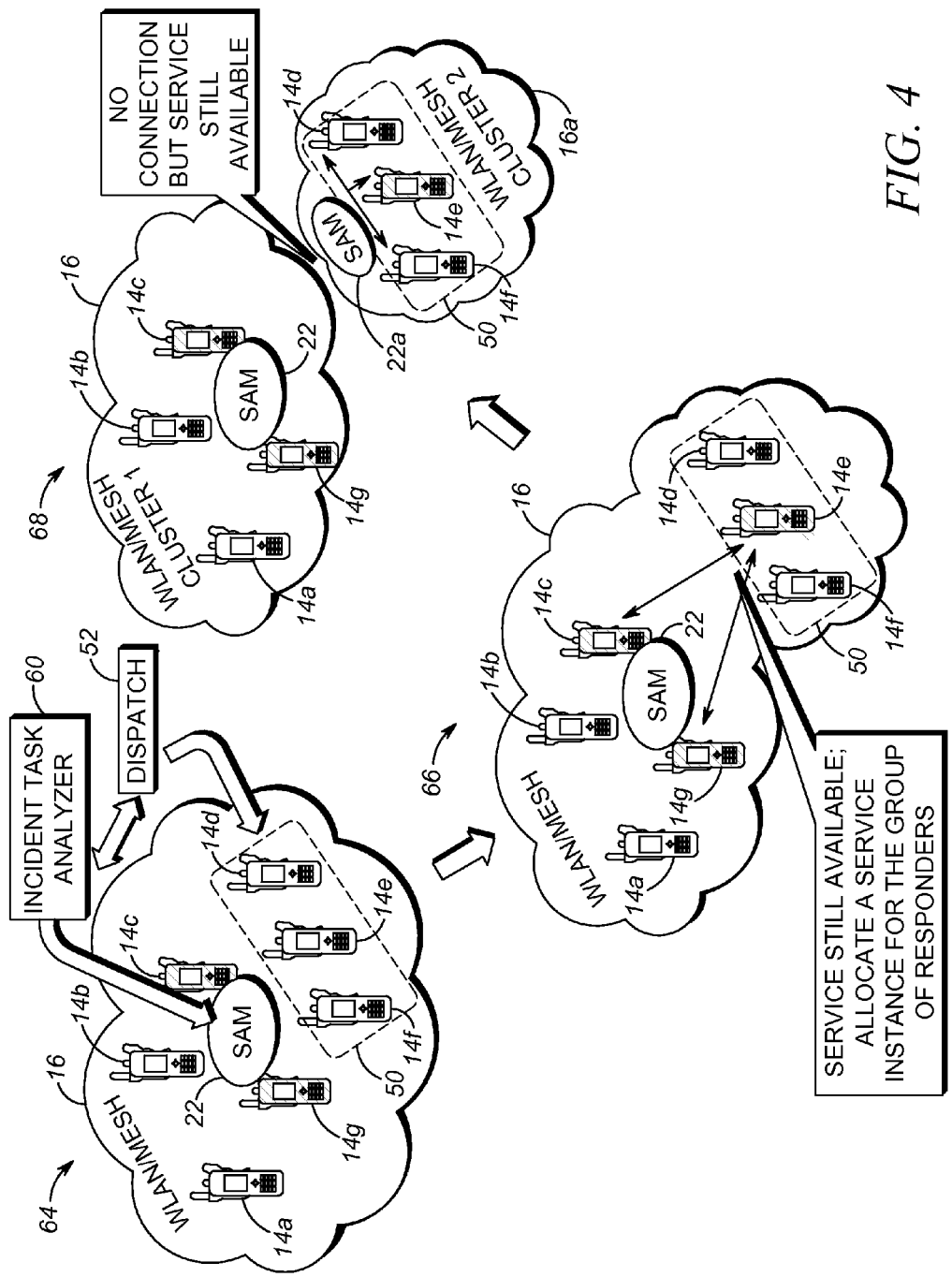
FIG. 4 is a network diagram over time of the network of FIG. 1 illustrating an incident task analyzer for an incident task based allocation of services to address when a group of responders is separated from the WLAN in accordance with some embodiments.

FIG. 4 is a network diagram over time of the network 10 illustrating an incident task analyzer 60 for an incident task based allocation of services to address when the group of responders 50 is separated from the WLAN 16 in accordance with some embodiments. Specifically, FIG. 4 illustrates the same exemplary operation as FIG. 3 with the incident task analyzer 60 and associated functionality. The incident task analyzer 60 includes additional logical functionality along with the SAM 22 to predict which mobile devices 14 (from among mobile devices 14a-14g) may lose connectivity, e.g., the mobile devices 14d, 14e, 14f associated with the group of responders 50, and to ensure needed service instances are deployed thereon prior to loss of connectivity. The incident task analyzer 60 can be implemented in a mobile device 14 associated with the incident commander, in a distributed fashion similar to the SAM 22, in a centralized manner, and the like.

In FIG. 4, when the incident commander or a dispatcher 52 assigns the group of responders 50 from the incident to a particular task (e.g., assigns them a function defined by ICS), the incident task analyzer 60 determines whether the task indicates that the group of responders 50 will (should) be 1) co-located and 2) are predicted to, or are predicted as likely to (i.e., more likely than not), lose connectivity with the rest of the WLAN 16 (step 64). If so, the incident task analyzer 60 informs the SAM 22 and provides the list of mobile devices that belong to the group of responders 50, i.e., the mobile devices 14d, 14e, 14f. The SAM 22 reallocates the service instances to ensure at least one service instance is available to the group of responders 50 working on the task (e.g., running on one or more of the responders' devices) (step 65). For example, the mobile device 14e in the group of responders 50 is selected in the example of FIG. 4 to mirror the service instances from the mobile devices 14c, 14g while the mobile device 14e is still connected to the WLAN 16. Advantageously, because the mobile device 14e establishes the service instances prior to loss of connectivity, the service instances on the mobile device 14e can synchronize with the existing service instances in the WLAN 16. When connectivity drops (step 66), the service will still be available for the group of responders 50 assigned to the task. For example, the group of responders 50 can form another WLAN 16a with an associated SAM 22a between them enabling local communication by the group of responders 50 despite being cut off from the WLAN 16 (step 68). Thus, the group of responders 50 can continue to operate services locally such as PTT, web, video, location, etc. between one another while losing overall connectivity to the WLAN 16.

Once connectivity is restored to the WLAN 16, the service instances on the mobile device 14e can synchronize again with the other service instances on the mobile devices 14c, 14g. Also, there can be a reallocation of the service instances at any time. It can be triggered by: more devices arrived at the scene or left/went out of coverage; a device hosted an instance disconnects from the WLAN or dies (battery); changes in the topology of the WLAN and/or intensity of the service usage, etc. For example, the reallocation can occur after the connectivity is restored to the WLAN 16.

Figure 5:
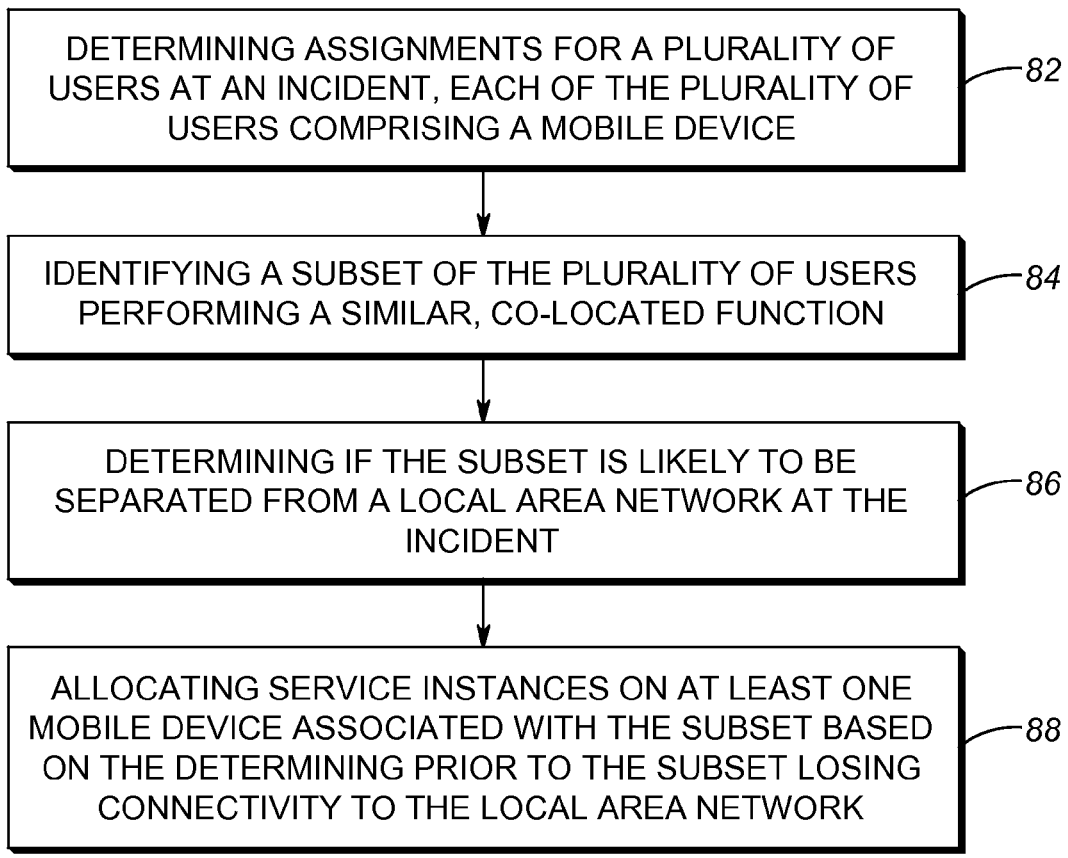
FIG. 5 is a flowchart of a method for an incident task based allocation of services in accordance with some embodiments.

FIG. 5 is a flowchart of a method 80 for an incident task based allocation of services in accordance with some embodiments. The method 80 can be performed by a mobile device 14 in the network 10 and is offered to assist the SAM 22 to properly assign service instances such that the group of responders 50 will have appropriate service instances that can be synchronized with the WLAN 16 prior to loss of connectivity. The method 80 can be integrated with the SAM 22 or be separate providing input thereto. In an exemplary embodiment, the method 80 can be implemented in a mobile device associated with the incident commander or with the dispatch 50 as well as being integrated with existing task assignment tools to further augment the SAM 22. That is, the method 80 provides exemplary functionality associated with the incident task analyzer 60 and its output can intelligently direct the SAM 22 for service instance allocation. Note, while the method 80 is described as follows, the same functionality can be implemented via the incident task analyzer 60 and/or through one or more mobile devices 14. The method 80 and the incident task analyzer 60 use incident task information to identify a set or group of responders who are expected to work together and place at least one of the service instances among the responders' devices before they form an isolated network cluster.

The method 80 includes determining assignments for a plurality of users at an incident, each of the plurality of users comprising a mobile device (step 82). For example, determining the assignments can be based on the responders' assignment to ICS tasks within the incident. The assignments are specific tasks that are based on the type of incident, and they can be based on the ICS roles. Those of ordinary skill in the art will appreciate the tasks can be anything and some exemplary tasks can include, without limitation, search and rescue in an area, respond to a specific area at the incident, perform triage, investigate a specific area, enter a structure, follow a suspect, etc. Assignments can also include location information since an exemplary service can include location tracking of all of the users. As part of the assignments, the incident commander or dispatcher can direct users for a given task. For example, assume the mobile device 14 of the incident commander is a tablet with a map, and the incident commander may assign tasks by pointing to where the users should go on the map on his/her tablet (i.e., explicit geo-spatial coordinates). Alternatively, the location information for the assignments can be an address from computer aided dispatch (CAD) (e.g., 123 Main Street). Further, the location information can be a relative location such as a specific distance from a known point. Additionally, the determining assignments step can also take into account device capabilities of each of the mobile devices associated with the users such as range, power, frequency of supported chipsets, service/application support, etc. Finally, as part of the assignments, environmental characteristics can be noted where the users will be going (e.g., in-building, metallic structures, urban/rural, etc.).

Next, the method 80 includes identifying a group of the plurality of users (i.e., which a group includes fewer than all of the plurality of users) performing a similar, co-located function (step 84). Here, the method 80 tracks all of the assignments over time and looks for correlation to provide the ability to predict whether a set of users (responders) will be in direct mode proximity of one another before they leave WAN coverage or Direct Mode coverage (via the LAN) at the incident scene. In the case where a set of responders get assigned to a tactical task by a dispatcher or incident commander, they can indicate in the method 80 whether the task implies that the responders are expected to be co-located (e.g., two teams of firefighters are instructed to enter a building from opposite sides of the building). Alternatively, the method 80 can automatically detect this expected co-location based on the various attributes of the assignments (e.g., teams of responders are assigned to search and rescue in a same area, etc.). The step 84 is related to co-located assignments of users. Other ways for identifying a similar, co-located function include responders with a similar role, responders associated with the same work group or talkgroup, responders with the same agency, responders associated with the same task, etc. As described herein co-located can include near one another or at a same area.

Next, the method 80 includes determining if the group is likely to be, i.e., are predicted to be, or are predicted as likely (i.e., more likely than not) to be, separated from a wireless local area network at the incident (step 86). This step 86 deals with predictions, based on the assignments at step 80, of whether the group will need its own set of service instances. Note, if the assignments for the group are to remain in close proximity to the incident commander, it is likely that the group will not be disconnected from the LAN and thus requires no special service instance allocations since the users in the group are not expected to lose LAN connectivity. On the other hand, if the group is assigned to search and rescue in a remote area or to enter a tall building with spotty coverage, etc., the method 80 can determine it is important to allocate the service instances such that islands of users are identified before they actually form an isolated network cluster to provide time to launch a new service instance and synchronize data with the existing instances. Note, the method 80 can also launch services after the isolated network cluster is formed, but without synchronizing data with existing instances (this can occur once the isolated network cluster is connected once again).

Finally, the method 80 includes allocating service instances on at least one mobile device associated with the group based on, i.e., in response to, the determining at step 86, which allocating occurs prior to the group losing connectivity to the wireless local area network (step 88). Again, the objective of the method 80 is to identify islands of users before they actually form an isolated network cluster, thereby providing time to launch a new service instance in the group and to synchronize data with the existing instances. The step 88 can include directing the SAM 22 to allocate service instances on at least one mobile device associated with the group and/or can include augmenting or creating a SAM 22 in one or more devices of the group. That is, the SAM 22 function of the prior art is enhanced to take the new information into account in order to accomplish a pre-allocation of services instances and to place at least one service instance among devices of the identified group of responders. The predictive nature of the method 80 pre-allocates the services instances to at least one device in the group prior to a predicted separation such that the service instance can synchronize with other associated service instances on the LAN. Stated differently, the method 80 (and the incident task analyzer 60) does not simply set up new service instances on isolated clusters, but rather predicts isolated clusters ahead of time based on intelligent analysis of the assignments such that the service instances are properly allocated ahead of time before the clusters are isolated. This provides seamless communications in the field.

One of the SAM 22 approaches is one SAM instance per (service-hosting-capable) device. Those SAM 22 instances will collaborate to determine what services run and where. The method 80 assumes that in the case of the distributed SAM 22 function the incident task analyzer 60 that is providing the cross-layer optimization hint will need to communicate that hint to the SAM 22 function instances on all of the (service-hosting-capable) devices associated with the responders that have just been assigned a new common task.

Again, in cases when a Wireless WAN is either not available or has limited bandwidth, the method 80 and the incident task analyzer 60 ensure that services will be available through local hosting on the LAN by associated mobile devices 14. Responders working in small workgroups (e.g., fire search and rescue, SWAT entering a school, etc.) will be able to maintain continuous operation and obtain and share incident, environmental, and individual intelligence between them, even if they lose connectivity with the Incident LAN and other on-scene responders. Note, once LAN coverage is reestablished, the service instances on the group can automatically synchronize with the LAN, providing seamless interconnectivity to the LAN.

Advantageously, the method and apparatus introduce an Incident Task Analyzer (ITA) function, as well as coupling the ITA with the Service Allocation Manager (SAM), to accurately predict and enhance service instance allocations. The ITA provides prediction of a group of users or mobile devices from among a larger group of users or mobile devices that will need localized service(s) based on the inputs and analysis of the ITA function. The ITA function takes existing input parameters that are available at a public safety incident scene—assignments, area, terrain, device capabilities, etc.—and correlates users for co-location and similar assignments as well as determining if any co-located users may become an isolated cluster from a LAN. The determining can also distinguish between what services are needed. For example, a group entering a building for search and rescue may not need to share video between one another, but likely will need PTT and location tracking, for example. Thus, the ITA can further distinguish what services are needed based on the assignments.

The disclosure claims a method for taking incident related information from the Incident Task Analyzer (ITA) to enable prediction of the need to allocate services to responder device(s) within responder groups (i.e., sub-groups) from among a larger group of responders and/or their mobile devices at an incident scene prior to the sub-group being separated from main responder group and/or losing WAN coverage. Included is the prediction of when responders will likely be separated (and those responders that will work together) from the main responder group. The ITA is a newly disclosed functionality that enables dispatch to specify incident related attributes to facilitate the Service Allocation Manager (SAM) to perform allocation of services to appropriate wireless device(s). Attributes utilized to enable prediction of responders which will be part of sub-groups include (but not limited to) the specific responder task being performed, location/area of responders who are assigned to incident response, responder device capabilities, responder physical environment. Information from the ITA is signaled to a Service Allocation Manager (SAM) to enable allocation of services on device(s) within the identified sub-groups at an incident scene. Use cases for ITA and SAM functionality span a wide variety of situations, including scenarios where WAN coverage is limited or non-existent, responders are in buildings or areas that limit access to WANs, incident responders get separated as the incident evolves, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for task-based allocation of host services at an incident scene, comprising:
   determining task assignments for a plurality of users at the incident scene, each of the plurality of users associated with a corresponding mobile device that is initially within wireless local area network coverage at the incident scene;
   identifying a group of the plurality of users performing a same or similar function near one another or at a same area;
   determining, based on the determined task assignments for the plurality of users in the identified group, that the identified group and their respective mobile devices are likely to be separated from the wireless local area network at the incident scene; and in response to determining that the identified group and their respective mobile devices are likely to be separated from the wireless local area network, while the identified group and their respective mobile devices are still within the wireless local area network and before the identified group and their respective mobile devices become separated from the wireless local area network, newly allocating a host service instance on at least one mobile device in the identified group on which the host service instance was not previously allocated to replicate an existing host service instance already allocated at another mobile device in the wireless local area network that is not in the identified group, the newly allocated host service instance for providing host client/server-based services to the remaining mobile devices in the identified group.

2. The method of claim 1, wherein the newly allocated host service instance is one of a video service, a web service, a push-to-talk service, and a location service.

3. The method of claim 1, further comprising:
determining the task assignments based on input from an incident commander or dispatcher, wherein each of the task assignments comprises any of a specific task to be performed by a respective user, an area at which the respective user is to perform the specific task, and environmental characteristics associated with the specific task.

4. The method of claim 3, wherein the task assignments comprise Incident Command System (ICS) tasks.

5. The method of claim 1, further comprising:
identifying the group of the plurality of users performing the same or similar function based on the task assignments and associated information comprising a specific task to be performed by a respective user, an area at which respective user is to perform the specific task, and environmental characteristics associated with the specific task.

6. The method of claim 1, further comprising:
performing the determining steps and the identifying step in an incident task analyzer; and
causing the new allocating in a host service allocation manager.

7. The method of claim 6, wherein the host service allocation manager is operated in a distributed fashion between all mobile devices associated with the plurality of users.

8. The method of claim 1, further comprising:
synchronizing the newly allocated host service instance on the at least one mobile device in the identified group with the existing host service instance in the another mobile device in the wireless local area network prior to the identified group losing connectivity to the wireless local area network.

9. The method of claim 8, wherein the newly allocated host service instance is one of a video service, a web service, a push-to-talk service, and a location service.

10. An apparatus for task-based allocation of host services at an incident scene, comprising:
a network interface, memory, and a processor each communicatively coupled therebetween; and
instructions stored in the memory that, when executed, cause the processor to:
determine task assignments for a plurality of users at an incident, each of the plurality of users associated with a corresponding mobile device that is initially within wireless local area network coverage at the incident scene;
identify a group of the plurality of users performing a same or similar function near one another or at a same area;
determine, based on the determined task assignments for the plurality of users in the identified group, that the identified group and their respective mobile devices are likely to be separated from the wireless local area network at the incident scene; and
in response to determining that the identified group and their respective mobile devices are likely to be separated from the wireless local area network, while the identified group and their respective mobile devices are still within the wireless local area network and before the identified group and their respective mobile devices become separated from the wireless local area network, cause a new allocation of a host service instance on at least one mobile device in the identified group on which the host service instance was not previously allocated to replicate an existing host service instance already allocated at another mobile device in the wireless local area network that is not in the identified group, the new allocation of the host service instance for providing host client/server-based services to the remaining mobile devices in the identified group.

11. The apparatus of claim 10, further comprising instructions stored in the memory that, when executed, cause the processor to:
synchronize the newly allocated host service instance on the at least one mobile device in the identified group with the existing host service instance in the another mobile device in the wireless local area network prior to the identified group losing connectivity to the wireless local area network.

12. The apparatus of claim 11, wherein the newly allocated host service instance is one of a video service, a web service, a push-to-talk service, and a location service.

13. The apparatus of claim 10, further comprising instructions stored in the memory that, when executed, cause the processor to:
determine the task assignments based on input from an incident commander or dispatcher, wherein each of the task assignments comprises any of a specific task to be performed, an area at which to perform the specific task, and environmental characteristics associated with the specific task.

14. The apparatus of claim 10, further comprising instructions stored in the memory that, when executed, cause the processor to:
identify the group of the plurality of users performing the same or similar function based on the task assignments and associated information comprising a specific task to be performed, an area at which to perform the specific task, and environmental characteristics associated with the specific task.

15. The apparatus of claim 10, wherein the newly allocated host service instance is one of a video service, a web service, a push-to-talk service, and a location service.

* * * * *